United States Patent [19]
Goldberg et al.

[11] Patent Number: 5,966,639
[45] Date of Patent: Oct. 12, 1999

[54] SYSTEM AND METHOD FOR ENHANCING SPEECH INTELLIGIBILITY UTILIZING WIRELESS COMMUNICATION

[75] Inventors: Jack Goldberg, San Diego, Calif.; Mead C. Killion, Elk Grove Village, Ill.; James R. Hendershot, Grants Pass, Oreg.

[73] Assignee: Etymotic Research, Inc., Elk Grove Village, Ill.

[21] Appl. No.: 08/835,121

[22] Filed: Apr. 4, 1997

[51] Int. Cl.[6] .............................. H04B 1/00; H04B 7/00
[52] U.S. Cl. .......................................... 455/11.1; 455/500
[58] Field of Search ............................. 455/11.1, 16, 17, 455/20–23, 41, 42, 45, 500, 517, 526, 100, 159.1, 76

[56] References Cited

U.S. PATENT DOCUMENTS

| | | | |
|---|---|---|---|
| 4,107,613 | 8/1978 | Queen et al. | 325/348 |
| 4,259,745 | 3/1981 | Fukuoka | 455/159 |
| 5,396,224 | 3/1995 | Dukes et al. | 340/825.49 |
| 5,483,691 | 1/1996 | Heck et al. | 455/234.2 |
| 5,563,951 | 10/1996 | Wang et al. | 381/24 |
| 5,572,264 | 11/1996 | Mizukami et al. | 348/735 |
| 5,678,177 | 10/1997 | Beasley | 455/16 |
| 5,722,053 | 2/1998 | Kornfeld et al. | 455/86 |

FOREIGN PATENT DOCUMENTS 2188515  9/1987  United Kingdom .

*Primary Examiner*—Reinhard J. Eisenzopf
*Assistant Examiner*—Duc Nguyen
*Attorney, Agent, or Firm*—McAndrews, Held & Malloy, Ltd.

[57] ABSTRACT

A system for enhancing speech intelligibility using wireless communication is provided. The system has a number of talker units, each having a microphone and a transmitter so that an audio input received at the microphone is transmitted via the transmitter as an output. The system includes a receiver unit having a receiver to receive the outputs of the talker units, and a mixer to mix the outputs to form a mixed output signal, and a transmitter to transmit the mixed output signal on a preselected frequency. The system also has a listener unit tunable to receive the mixed output signal transmitted on the preselected frequency. The system can be embodied in a serial daisy chain arrangement or in a parallel repeater arrangement. A method for enhancing speech intelligibility using wireless communication is provided. The method has the steps of: providing a listener unit to at least one listener and a talker unit to each of a plurality of talkers, each talker unit being capable of transmitting an audio signal; receiving the audio signals from the plurality of talker units; mixing the audio signals to form a mixed output signal; transmitting the mixed output signal on a preselected frequency; and receiving the mixed output signal at the listener unit on the preselected frequency.

23 Claims, 3 Drawing Sheets

SYSTEM AND METHOD FOR ENHANCING SPEECH INTELLIGIBILITY UTILIZING WIRELESS COMMUNICATION

BACKGROUND OF THE INVENTION

The present invention relates generally to instrumentation commonly referred to as "assistive listening devices" and more particularly relates to a method and system for the enhancement of speech intelligibility utilizing wireless communication in which a group of talkers has a microphone and a transmitter operating in combination with a receiver arranged to accept each of the transmitted signals and pass the combined signal on to hearing aids or earphones. The listener is thereby provided with a relatively noise free signal from each of the desired talkers.

Hearing-impaired people often have difficulty comprehending speech in noisy and/or reverberant environments such as encountered at parties or in a restaurant. The hearing-impaired person may have difficulty comprehending the speech of the talkers due to: 1) a hearing aid that may not adequately correct for the loss of hearing sensitivity to quiet sounds, or 2) a residual hearing acuity that is inadequate to permit that person to understand speech in the presence of noise levels that normal-hearing individuals find acceptable for carrying on a conversation. The first problem—lack of adequate audibility at some frequencies—can often be corrected with readjustment or change in the hearing aid circuit. The second problem—lack of adequate acuity—cannot be corrected with any known circuit. To explain: those with normal hearing can carry on a conversation at a signal-to-noise ratio (SNR) of 0 to −5 dB, meaning the noise may be as much as 5 dB more intense than the desired speech signal. Individuals with moderate-to-severe hearing loss, on the other hand, may often require an SNR of +5 to +10 dB, 10 dB greater than those with normal hearing. The impossibility of a circuit solution to the problem is seen, for example, by the fact that no circuit can know which of many voices at a party is noise and which is considered signal. (It is well known that a listener can switch his or her attention at will from one talker to another at a noisy party, often while continuing to look at the original uninteresting talker.) These and other considerations are discussed in more detail by Mead C. Killion in an editorial "Hearing Aids: Past, Present, and Future" scheduled to appear in the May 1997 issue of the British Journal of Audiology.

The SNR problem has been most obvious with children having severe-to-profound hearing loss. Such children find it impossible to properly understand the teacher when they wear even the best conventional hearing aids in a typical classroom. The use of FM systems (such as are currently available from manufacturers such as Telex of Minnesota and others) have provided a substantially improved SNR for such children, permitting them to learn and understand speech in classroom settings.

In FM systems, the teacher's voice (or other audio signal, perhaps from a video tape or audio recording) is used to frequency modulate a radio frequency carrier which is transmitted within the classroom. The students are then equipped with FM receivers. The FM receivers pick up the transmitted signal, demodulate it, and present received audio either to the students' hearing aids or to their ears via headphones or earphones. In this particular example, there is one audio signal which is transmitted, that being the teacher's voice.

A severely hearing-impaired adult at a restaurant may face a similar difficulty with respect to noise, but now at least three talkers (assuming the case where two couples go out to eat) need to be heard. Passing a single microphone around is sometimes done as an effective, but inconvenient, solution. Similarly, head-worn hearing aids including FM receivers used with single-microphone FM transmitters are increasingly being used. One such effective system is manufactured by AVR Communications in Israel.

What is clearly needed, however, is a convenient multiple-microphone pickup system where each microphone operates in a wireless mode. Such a system would serve both those with hearing impairment and normally-hearing individuals, allowing both to communicate in difficult situations and environments. Such systems can be made small enough to also be used by individuals who wish to communicate discreetly with their undercover teammates.

BRIEF SUMMARY OF THE INVENTION

It is an advantage of the present method and system for enhancing speech intelligibility utilizing wireless communication that it provides a set of transmitters to a group of talkers wherein each transmitter operates independently on a separate frequency (or channel) in combination with a serial daisy-chain repeater system in which the final repeater retransmits the combined signal for reception by a listener, or a parallel repeater subsystem which incorporates a multichannel receiver to pick up each of the transmitted signals and retransmit the combined signal on another channel for reception by a listener.

A further advantage of the present method and system for enhancing speech intelligibility utilizing wireless communication is that it provides a system which can accommodate a number of talkers simply by expanding the number of channels in the repeater or the number of units in the daisy chain. Each unit in the daisy chain uses a separate channel for transmitting.

It is still another advantage of the method and system of the present invention to provide a wearable, battery-operated, expandable communications system configurable for a number of talkers and multiple listeners. Such a system preferably operates in the 216–217 MHz region.

To this end, a method for enhancing speech intelligibility utilizing wireless communication is provided. In an embodiment, the method has the steps of: providing a listener unit to at least one listener and a talker unit to each of a plurality of talkers, each talker unit being capable of transmitting a wireless signal; receiving the wireless signals from the plurality of talker units; demodulating the wireless signals into audio signals; mixing the audio signals to form a mixed output signal; transmitting the mixed output signal on a preselected frequency; and receiving the mixed output signal at the listener unit on the preselected frequency. In an embodiment, the audio signals are mixed during the demodulating step.

In addition, a serial daisy chain system for enhancing speech intelligibility utilizing wireless communication is also provided. The system includes a talker unit having a microphone and a transmitter constructed and arranged so that an audio input received at the microphone is transmitted via the transmitter as an output. A further talker unit is provided. The further talker unit has a microphone, a transmitter, a receiver constructed and arranged to receive the output and a mixer constructed and arranged to mix the output received from the talker unit with a further audio input received at the microphone of the further talker unit to form a mixed audio signal. The further talker unit transmits the mixed audio signal on a preselected frequency. A listener unit tunable to receive the mixed audio signal transmitted on the preselected frequency is also provided.

Further, a parallel repeater system for enhancing speech intelligibility using wireless communication is also provided. The system includes a plurality of talker units, each having a microphone and a transmitter constructed and arranged so that an audio input received at the microphone is transmitted via the transmitter as an output. The system also has a receiver unit having a receiver constructed and arranged to receive the outputs of the plurality of talker units, a mixer constructed and arranged to mix the outputs to form a mixed output signal, and a transmitter constructed and arranged to transmit the mixed output signal on a preselected frequency. Finally, a listener unit tunable to receive the mixed output signal transmitted on the preselected frequency is provided.

DETAILED DESCRIPTION OF THE INVENTION

A method and system for the enhancement of speech intelligibility utilizing wireless communication is provided. An embodiment of the method and system addresses the situation in which a listener or a group of listeners (who may or may not be hearing impaired) desires to comprehend the speech of one or more talkers in the presence of background noise or reverberation (another form of noise). The present invention is particularly useful to hearing-impaired individuals, normal-hearing individuals who must communicate in difficult situations, and individuals who wish to communicate discreetly.

An embodiment of the method and system is implemented as a one-way communications system. This basically means that the system is designed in particular to aid a set of listeners in the comprehension of a set of talkers. Each talker must therefore be equipped with a specific subsystem as part of the invention. This is preferably a microphone and a transmitting device. Also, each listener must be equipped with a different specific subsystem as part of the invention. This subsystem is a receiver-type unit. It is possible, however, to equip any individual as both a talker and a listener simultaneously in the method and system of the present invention, permitting two or more hearing-impaired individuals to benefit from the system.

As mentioned above, an example of such a situation in which the present invention has great utility is the situation in which a hearing-impaired individual needs to be part of a group discussion but is unable to participate due to the presence of noise or reverberation. With the system of the present invention, the hearing-impaired person may equip each of the important talkers with a unit (a transmitter subsystem) which transmits on a preselected channel and equip himself with a different unit (a receiving subsystem) which receives the combined signals from the equipped talkers and is thereby enabled to effectively conduct the meeting or discussion. The receiving subsystem may be either the multichannel receiver unit in a parallel arrangement or the last transmitter in a serial daisy chain arrangement. Both systems are portable, easy to operate, inexpensive and effective.

Figure 1:
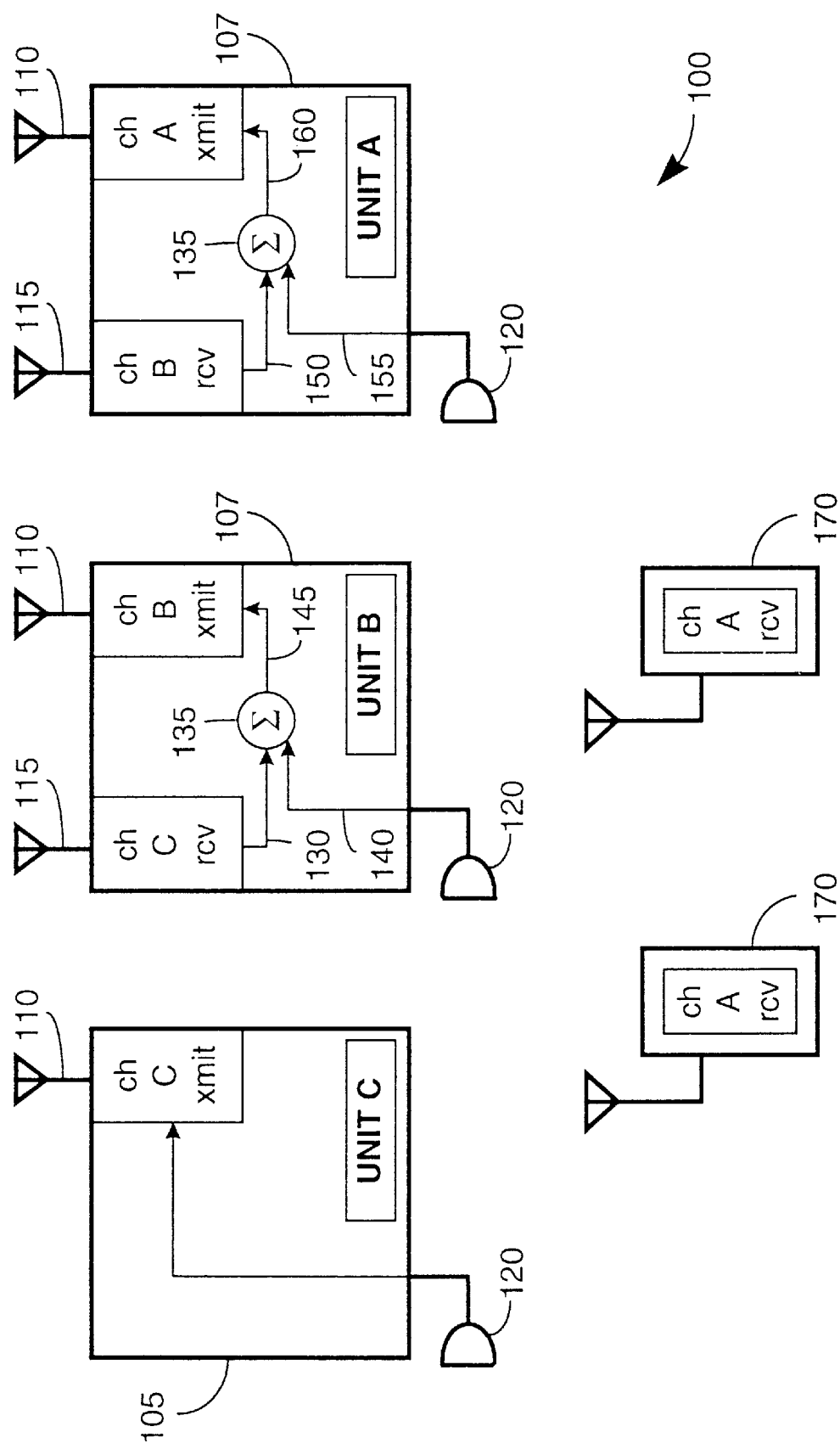
FIG. 1 is a schematic diagram illustrating an embodiment of a system of the present invention for enhancing speech intelligibility utilizing wireless communication in which the plurality of talker units are implemented in a serial daisy chain arrangement.

Referring now to the figures, FIG. 1 is an embodiment of a system for the enhancement of speech intelligibility utilizing wireless communication of the present invention. The system is indicated generally at 100, and comprises a plurality of talker units 105 and 107. The talker units 105, 107 are preferably worn, carried or attached to the talkers in a group in such a way that their attendant microphones are located close to the mouth of each talker (for example, on a shirt collar). Two different type of talker units 105 and 107 are illustrated. Talker units 107, also labeled Units A and B, have both transmit and receive capabilities. Talker unit 105, also labeled Unit C, has only transmit capabilities. In these units, transmit antennas 110 and receive antennas 115 are shown separately, although a duplex arrangement is also possible. Each talker unit 105, 107 is also provided with a microphone 120. In a preferred embodiment, the microphone 120 is a small electret microphone available from Knowles Electronics in Illinois or Primo in Japan. In either case, such a microphone is preferably located close to the talker's mouth.

In the embodiment of FIG. 1, Units A and B function as repeaters. For example, Unit B receives transmitted audio from Unit C. This transmitted audio is indicated at 130 in FIG. 1. Unit B also has an audio mixer 135 for mixing the transmitted audio 130 from Unit C with local microphone audio from Unit B indicated at 140. The combined audio of talkers C and B indicated at 145 is an output of the mixer 135, which is then transmitted over transmit antenna 110 from Unit B to receive antenna 115 of Unit A. Unit A thus receives the transmission from Unit B containing the audio of talkers B and C. This combined audio is received in Unit A and transmitted to the mixer 135 as indicated at 150. The mixer 135 similarly mixes Unit A microphone audio 155 with the combined audio 150 to provide a combined output 160 which is transmitted via the Unit A transmit antenna 110. The combined output 160 of talkers A, B and C is thereby transmitted to one or more channel A receivers indicated at 170. The channel A transmission is the sole signal received by the various hearing-impaired listeners who are equipped with the channel A receivers 170. In a preferred embodiment, the channel A receivers 170 are subminiature FM receivers available from Phonak Communications of Switzerland. These receivers are designed to operate from a conventional number 10A subminiature hearing aid battery, and are small enough to fit entirely within the ear. In an embodiment, an integrated circuit chip implementation of an FM receiver mounted on hybrid to form complete unit is provided.

The arrangement shown in FIG. 1 is termed a serial "daisy chain" arrangement. The "daisy chain" refers to the fact that each of the three units (Unit A, Unit B and Unit C) must be present and functioning in order for the talker who is using Unit C to be heard by the listener or listeners using the channel A receivers 170. Similarly, Unit A must be present and functioning in order for the talker using Unit B to be heard. FIG. 1 illustrates talker units 105, 107 for three talkers but the number can also be expanded. Also, FIG. 1 illustrates two channel A receivers 170 need by two listeners. However, this number is also variable.

The daisy chain arrangement is quite attractive because it provides the capability for many hearing-impaired listeners to be included. The daisy chain approach also provides for expansion and is relatively simple. As set forth above, Units A and B include both receiving and transmitting circuits. The separation of the carrier frequencies used in the receiver and transmitter is likely to be about 500 kHz. The carrier frequencies cannot be separated by much more than this amount because of the 1 MHz width of the FCC allocation. This requires that the transmit and receive antennas 110, 115 be suitably separated from each other to avoid the transmitted signal overloading the receiver.

Figure 2:
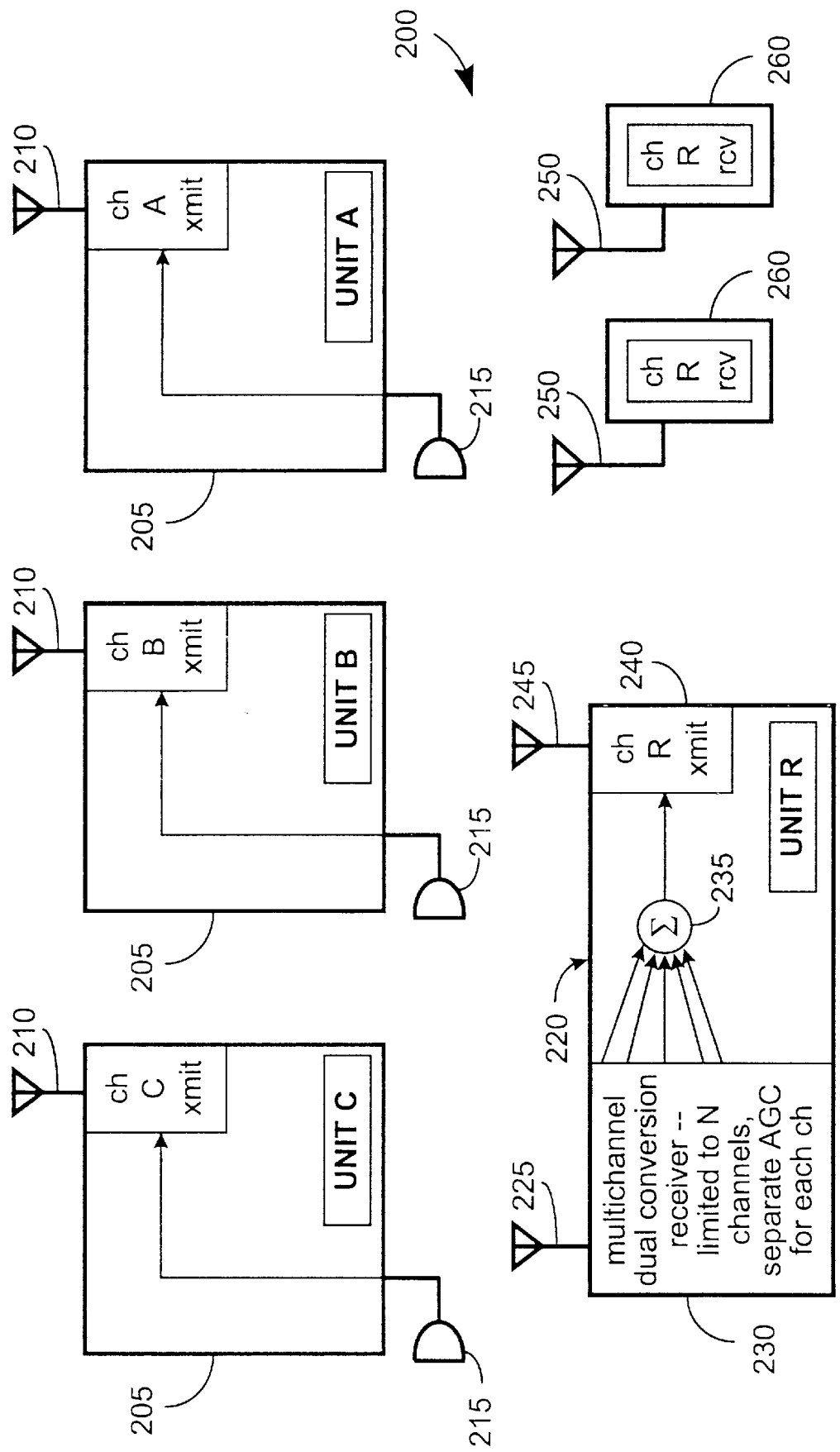
FIG. 2 is a schematic diagram illustrating an embodiment of a system of the present invention for enhancing speech intelligibility utilizing wireless communication in which the plurality of talker units are implemented in a parallel repeater arrangement.

FIG. 2 illustrates another embodiment of the system of the present invention having a parallel receiver channel arrangement. The system is indicated generally at 200. In this system 200, talker units 205 are provided. The talker units 205 are labelled Unit A, Unit B and Unit C. Each talker unit 205 is virtually identical except for transmit frequency. For example, preferred frequencies may be selected as follows: Unit A, 216.1 MHz; Unit B, 216.3 MHz; and Unit C, 216.5 MHz.

Each talker unit 205 includes a transmit antenna 210 and a microphone 215. Also, each talker may wear a talker unit 205 as a lapel or shirt collar microphone, for example. As the talker speaks, the speech provides an audio input to the microphone 215, which is subsequently transmitted over the transmit antenna 210.

A transceiver Unit R indicated at 220 is also provided. Unit R includes a receiver antenna 225 connected to a multichannel receiver 230. The receiver 230 may be a multichannel dual conversion receiver, for example, configured to accept a number of channels. The receiver 230 may also have a separate automatic gain control (AGC) for each channel.

In operation, the audio signals from each of the talker units 205 transmitted over the individual antennas 210 are received at the receiver antenna 225 of Unit R and summed at a mixer 235 within Unit R. A transmitter 240 receives the combined, mixed signal and sends it via transmitting antenna 245 of Unit R. Receiving antennas 250 are provided on channel R receivers 260 which are tuned to receive the Unit R transmission. Thus, Unit R receives all of the talkers' signals and retransmits them onto a single channel R which is received by the channel R receivers 260.

In a preferred embodiment, the channel R receivers 260 are microminiature FM. receivers available from Phonak Communications of Switzerland. In addition, Unit R can preferably be located on one of the listeners, in a shirt pocket, for example.

Figure 3:
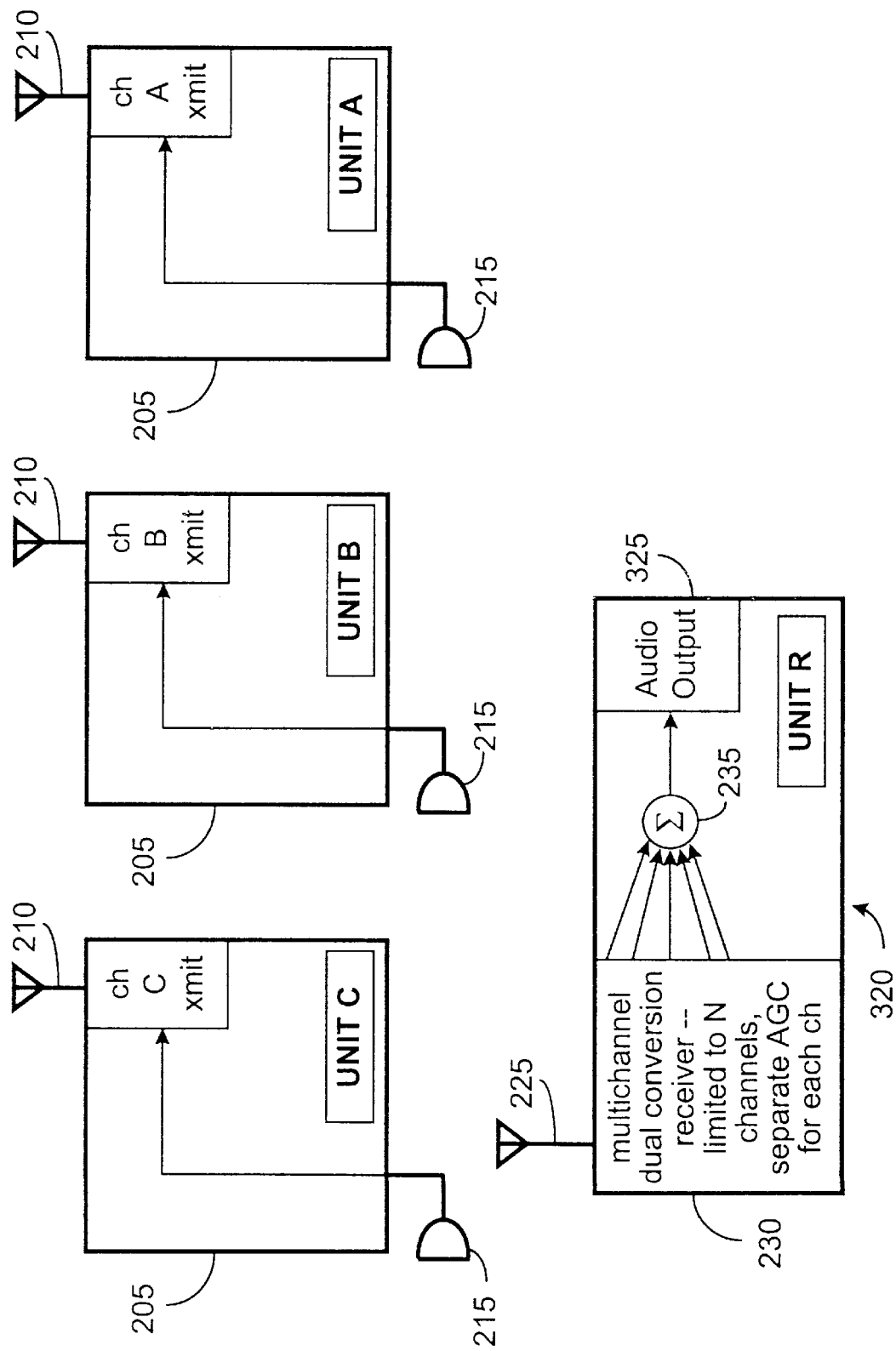
FIG. 3 is a schematic diagram illustrating a simplified embodiment of a system of the present invention for enhancing speech intelligibility utilizing wireless communication in which the plurality of talker units are implemented in a parallel repeater arrangement and having a direct audio output.

FIG. 3 illustrates an alternate embodiment of the parallel repeater arrangement shown in FIG. 2 wherein like numerals represent like parts. Unit R indicated at 320 is provided with a direct audio output 325 connected to the output of the mixer 235, thereby eliminating the transmitter 240 found in Unit R 220 of FIG. 2. Unit 320 of FIG. 3 is otherwise identical to Unit R 220 of FIG. 2.

With this arrangement, a single listener will typically have a hearing aid or earphone wired to the audio output 250, from which he will receive signals from all transmitter units as described above. The advantage of the alternate version shown in FIG. 3 is a reduced cost, since one FM transmitter and one FM receiver are eliminated. A disadvantage is that if more than one listener is involved, a complete multichannel receiver unit 320 is required for each listener. Where three listeners are involved, the cost advantage probably vanishes.

Although FM transmitters and receivers have been described above, it is clear that AM or single-sideband modulation would also provide the desired wireless transmission. Similarly, a high-linearity broadband AM receiver would permit several discrete AM signals to be simultaneously demodulated in the same receiver. If the separation between carrier frequencies was sufficiently great to avoid audible beats (as between carriers 5 kHz apart, for example), then the AM demodulator itself performs the audio mixer function.

While particular elements, embodiments and applications of the present invention have been shown and described, it will be understood that the invention is not limited thereto since modifications may be made by those skilled in the art, particularly in light of the foregoing teachings. The appended claims are intended to cover such modifications, especially those which incorporate those features which come within the spirit and scope of the invention.

We claim:

1. A method for enhancing speech intelligibility using wireless communication, the method utilizing a portable, battery-powered and entirely user supportable communication system, the method comprising the steps of:

transmitting, by each of a plurality of talker units on a separate frequency, a wireless signal;

receiving, by a multichannel receiver of a user-supportable receiver unit, the wireless signals from the plurality of talker units;

demodulating, by the receiver unit, the wireless signals into audio signals;

mixing, automatically by the receiver unit without requiring operator control, the audio signals to form a mixed output signal;

transmitting, by the receiver unit, the mixed output signal on a preselected frequency; and receiving the mixed output signal at a listener unit on the preselected frequency.

2. The method of claim 1, further comprising the step of:
mixing the audio signals during the demodulating step.

3. A method of enhancing speech intelligibility utilizing wireless communication, the method utilizing a portable, battery-powered and entirely user-supportable communication system, the method comprising the steps of:

transmitting an audio signal received at a microphone of a user-supportable talker unit;

receiving the audio signal at a receiver of a further user-supportable talker unit;

mixing, automatically without requiring operator control, the audio signal with a further audio signal received at a microphone of the further user-supportable talker unit using a mixer located in the further user-supportable talker unit to generate a mixed audio signal; and transmitting the mixed audio signal using the transmitter of the further user-supportable talker unit to a receiver of a listener unit.

4. The method of claim 3, further comprising the step of:
transmitting the mixed audio signal on a preselected frequency.

5. The method of claim 3, further comprising the step of:
transmitting the mixed audio signal on a preselected FM frequency.

6. The method of claim 3, further comprising the step of:

transmitting the mixed audio signal on a preselected FM frequency in a range of 216–218 MHz.

7. A method for enhancing speech intelligibility using wireless communication, the method utilizing a portable, battery-powered and entirely user-supportable communications system, the method comprising:

receiving, by a microphone of each of a plurality of talker units, an audio input;

transmitting, by a transmitter of each of the plurality of talker units, each of the transmitters operating independently on a separate frequency, an output corresponding to the audio input;

receiving, by a multichannel receiver of a user-supportable receiver unit, the outputs from the plurality of talker units;

mixing, automatically by a mixer of the receiver unit without requiring operator control, the mixed output signal;

transmitting, by a transmitter of the receiver unit, the mixed output on a preselected frequency; and receiving, at a listener unit, the mixed output signal on the preselected frequency.

8. A portable, battery-powered and entirely user-supportable system for enhancing speech intelligibility using wireless communication, the system comprising:

a user-supportable talker unit having a microphone and transmitter constructed and arranged so that an audio input received at the microphone is transmitted via the transmitter as an output;

a further user-supportable talker unit having a microphone, a transmitter, a receiver constructed and arranged to receive the output and a mixer constructed and arranged to, automatically without requiring operator control, mix the output received from the user-supportable talker unit with a further audio input received at the microphone of the further user-supportable talker unit to form a mixed audio signal, the further user-supportable talker unit transmitting the mixed audio signal on a preselected frequency; and a listener unit tunable to receive the mixed audio signal transmitted on the preselected frequency.

9. The system of claim 8, further comprising:

an FM transmitter arranged in the further talker unit.

10. The system of claim 8, further comprising a plurality of talker units.

11. The system of claim 10 wherein the plurality is greater than two.

12. The system of claim 8, further comprising:

an FM receiver arranged in the listener unit.

13. The system of claim 8, further comprising:

a plurality of narrowband FM transmitters, each transmitter having a transmit frequency of approximately 216 MHz with approximately 200 kHz frequency difference between each successive transmitter.

14. The system of claim 8, further comprising:

a narrowband FM receiver having a receive frequency of approximately 216 MHz arranged in the listener unit.

15. A portable, battery-powered and entirely user-supportable system for enhancing speech intelligibility using wireless communication, the system comprising:

a plurality of talker units, each having a microphone and a transmitter constructed and arranged so that an audio input received at the microphone is transmitted via the transmitter as an output, each output being transmitted on a separate frequency;

a user-supportable receiver unit having a receiver constructed and arranged to receive the outputs of the plurality of talker units, a mixer constructed and arranged to automatically mix the outputs to form a mixed output signal without requiring operator control, and a transmitter constructed and arranged to transmit the mixed output signal on a preselected frequency; and a listener unit tunable to receive the mixed output signal transmitted on the preselected frequency.

16. The system of claim 15, further comprising:

a multichannel dual conversion receiver arranged in the receiver unit.

17. The system of claim 16, further comprising:

independent automatic gain control for each channel of the multichannel dual conversion receiver.

18. The system of claim 15, wherein the mixed output signal is transmitted on a narrowband FM frequency.

19. The system of claim 15, wherein the listener unit is tunable to a narrowband FM frequency.

20. The system of claim 15, wherein the listener unit is a subminiature FM receiver.

21. The system of claim 15, wherein the listener unit further comprises an FM receiver formed of an integrated circuit chip mounted on a hybrid.

22. A system for enhancing speech intelligibility using wireless communication, the system comprising:

a first talker unit having a microphone and a transmitter constructed and arranged so that an audio input received at the microphone is transmitted via the transmitter as an output;

a second talker unit having a microphone, a transmitter, a receiver constructed and arranged to receive the output and a mixer constructed and arranged to mix the output with an audio input received at the microphone of the second talker unit to form a first mixed audio signal, the second talker unit transmitting the first mixed audio signal;

a third talker unit having a microphone, a transmitter, a receiver constructed and arranged to receive the first mixed audio signal and a mixer constructed and arranged to mix the first mixed audio signal with an audio input received at the microphone of the third talker unit to form a second mixed audio signal, the third talker unit transmitting the second mixed audio signal; and a listener unit tunable to receive the second mixed audio signal.

23. A system for enhancing speech intelligibility using wireless communication, the system comprising:

a first talker unit having a microphone and a transmitter constructed and arranged so that an audio input received at the microphone is transmitted via the transmitter as an output;

a second talker unit having a microphone, a transmitter, a receiver constructed and arranged to receive the output and a mixer constructed and arranged to mix the output with an audio input received at the microphone of the second talker unit to form a mixed audio signal, the second talker unit transmitting the mixed audio signal;

a plurality of further talker units, each having a microphone, a transmitter, a receiver constructed and arranged to receive a mixed audio signal from a previous talker unit and a mixer constructed and arranged to mix the mixed audio signal received from the previous talker unit with an audio input received at the microphone of the further talker unit to form a further mixed audio signal, each of the plurality of further talker units transmitting the further mixed audio signal; and a listener unit tunable to receive one of the plurality of further mixed audio signals.

* * * * *